United States Patent

Wepfer et al.

[15] 3,684,855

[45] Aug. 15, 1972

[54] PROCESS AND APPARATUS FOR SUBMERGED ARC WELDING

[72] Inventors: George R. Wepfer, 2545 N. 28th St., Wauwatosa, Wis. 53213; Bertil G. Winstrom, 4720 W. Parkview Dr., Mequon, Wis. 53092

[22] Filed: Jan. 14, 1971

[21] Appl. No.: 106,498

Related U.S. Application Data

[62] Division of Ser. No. 5,510, Jan. 26, 1970, Pat. No. 3,582,601.

[52] U.S. Cl..................219/73, 219/125 R, 219/76, 228/12
[51] Int. Cl. ..............................................B23k 9/18
[58] Field of Search......219/60, 61, 73, 76, 124, 125, 219/126, 137; 225/12

[56] References Cited

UNITED STATES PATENTS

| | | |
|---|---|---|
| 1,838,899 | 12/1931 | Arnold................219/125 R |
| 3,207,881 | 9/1965 | Pagan....................219/60 A |
| 1,751,077 | 3/1930 | D'Ardenne et al.....219/125 R |
| 1,801,140 | 4/1931 | Chapman..............219/125 R |
| 3,461,540 | 8/1969 | Rieppel et al..........219/61 X |

*Primary Examiner*—R. F. Staubly
*Assistant Examiner*—L. A. Schutzman
*Attorney*—Andrus, Sceales, Starke & Sawall

[57] ABSTRACT

A submerged arc welding process performed on adjacent longitudinal edges of a pipe blank. Two submerged arc welding units are supported on carriages which move on a stationary travel beam over the pipe blank. The welding units start welding at opposite ends of the longitudinal edges and weld toward each other until they meet. At that time one welding unit stops and returns while the second continues forward to overlap the welds while the fused flux remains electrically conductive at the area of overlap. After the second unit merges the welds, it returns.

9 Claims, 12 Drawing Figures

FIG_3

FIG_4

INVENTORS
GEORGE R. WEPFER
BERTIL G. WINSTROM
BY
Andrus, Sceales, Starke, & Sawall
Attorneys

FIG_5

FIG_6

FIG_7

FIG_8

FIG_9

INVENTORS
GEROGE R. WEPFER
BERTIL G. WINSTROM
BY
Attorneys

FIG_10

FIG_11
FIG_12

INVENTORS
GEORGE R. WEPFER
BERTIL G. WINSTROM
BY
Attorneys

PROCESS AND APPARATUS FOR SUBMERGED ARC WELDING

BACKGROUND OF THE INVENTION 1970

This is a division of an application having Ser. No. 5,510 filed Jan. 26, 1970 which subsequently issued into U.S. Pat. No. 3,582,601 on June 1, 1971, and the invention relates to welding and more particularly to a submerged arc welding apparatus which initiates a weld at opposite ends of a metal workpiece and overlaps the welds where the welds meet.

Submerged arc welding has many applications and is sometimes preferred over resistance welding processes because of the higher quality welds achieved with the former method. Generally, in submerged arc processes, a powder flux is provided over the area to be welded and a hot electrode welds beneath the flux. The flux restricts oxidation during welding and part of it, defined here as the fused flux, melts over the weld pool. This fused flux solidifies upon cooling, while the remainder is maintained in powder form.

When a weld cools, the weld material shrinks, creating stresses in the workpiece and sometimes causing weld defects and end splitting of the workpiece at the weld. The stress problem is magnified when long welds are required, such as in longitudinal pipe seam applications. Pipe seams of 40 foot length are standard and tremendous stresses will tend to pull against such a lengthy seam weld as it cools. Heavy fixtures are required to hold the pipe and prevent massive splitting due to such forces.

Yet, even heavy fixtures do not adequately hold the ends of the pipes, which often split at the seam ends and must be trimmed before use. To a lesser degree, the same difficulty is experienced in welding items other than pipe, the amount of splitting depending on the length of the welds required and the capability of the holding fixtures to restrain the ends of the workpiece.

SUMMARY OF THE INVENTION

The invention is a solution to the above problems and has other advantages which will be apparent from the drawings and specification.

In the invention, generally, a weld is accomplished by using two welding units and initiating submerged arc welds at opposite ends of a seam in the workpiece and welding toward the center of the seam. By starting at opposite ends of the weld line, end splitting can be avoided by using moderately heavy holding fixtures on the workpiece.

The welds on most workpieces must be continuous, as is the case in longitudinal pipe seam welds. Thus, in the method of the invention, two welding units are operated from opposite ends of the seam and meet at an intermediate line. At this intermediate line the welds are merged by operating one unit so that it welds into the weld provided by the other unit at the center of the weld.

The fused flux left by the first unit would not permit an arc to be established by the second unit if the fused flux cools or solidifies to the point where it is nonconductive. The invention avoids this problem by merging the welds while fused flux on the overlap area remains hot. To do this, a first welding unit stops welding and returns while the second unit follows the returning unit, thus welding into the weld crater left by the first unit while the fused flux remains hot and conductive. Then, the second unit terminates welding and returns.

The apparatus of the invention provides for sequential operation of the two welding units. For this purpose, two submerged arc welding units, one for each end of the weld line, are supported by carriages which run on a travel beam over the workpiece. Each welding unit has a control system which operates switches for the usual elements of an arc welding unit; namely, a welding head, a flux hopper, an electrode power line, a carriage drive, and a carriage drive control. The control systems are in turn operated by a cam operated switch on one of the units which is operated when the units meet by a corresponding cam arm on the opposite welding unit.

In the sequential operation for the practice of the invention, the welding units, after starting at opposite ends, meet toward the center of the weld line where the cam and cam operated switch engage to initiate a sequential shut down for the controls. On a first unit, the carriage drive is stopped, dynamic braking being applied, and after a short time period the carriage drive is reversed to return the unit. As the first carriage drive stops, the wire feed and flux hooper feed of the first unit are stopped and after a time period the arc power is cut off.

Simultaneously with the above operation of the first unit, the control switches of the second unit maintain its welding operation and carriage travel. The unit thus follows the returning first unit and welds into a still hot weld and fused flux provided thereby. Then the second carriage is stopped and returned as with the first, the wire feed and electrode switches being opened to stop the operation of their respective systems.

Thus, the invention provides an advantageous method and apparatus for submerged arc welding, which provide a high quality, continuous weld that is accomplished without splitting at the ends of the weld and with consequent saving of waste. The use of two welding units increases the speed of production for a further advantage of the invention.

The drawings illustrate the best embodiments presently contemplated by the inventors for the practice of the invention.

DESCRIPTION

Figure 1:
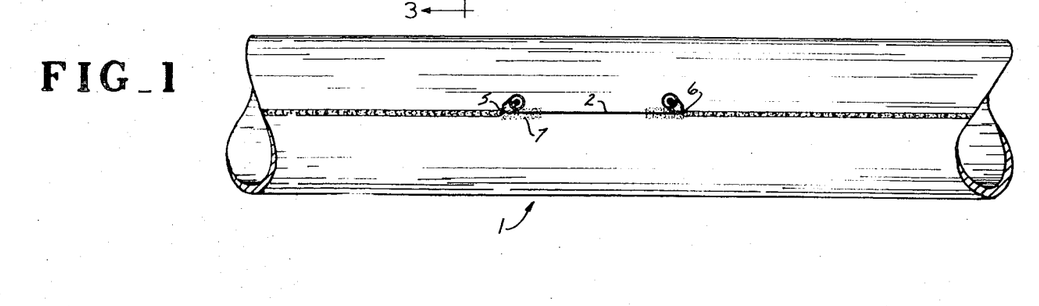
FIG. 1 is a top plan view of a section of a pipe blank being operated on by the invention.

In the drawings, a metal pipe blank 1 having adjoining longitudinal edges forming a seam 2 is shown being operated on by a first submerged arc welding unit 3 and a second submerged arc welding unit 4 on opposite ends of the seam. In FIG. 1 the welding units are not shown except for a section of their respective electrode hot ends 5 and 6 which are welding into a conventional powder flux 7 piled on seam 2. Electrode ends 5 and 6 start on opposite ends of seam 2 and travel toward each other in the manner of the invention.

Figure 3:
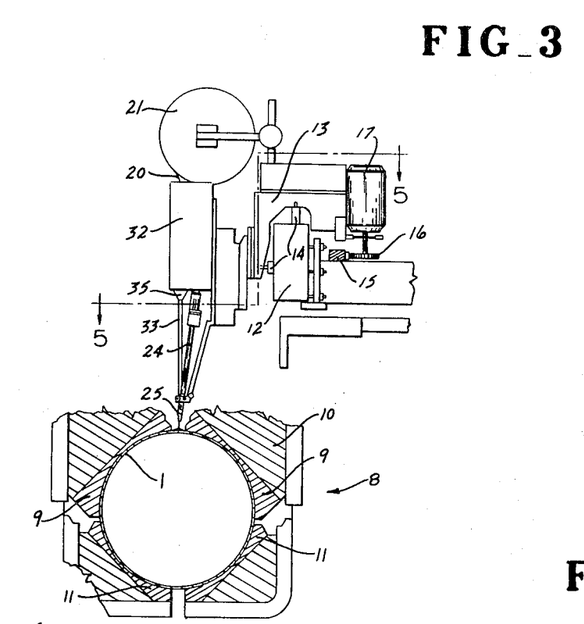
FIG. 3 is a sectional view taken at lines 3—3 of FIG. 2, with the accessory parts in view.

Pipe blank 1 is supported and confined by a metallic holding fixture 8 which may be constructed in general accordance with any conventional resistance welding or arc welding fixture. The fixture is illustrated best in FIG. 3 and is similar to that used in flash welding, having on each side of the pipe the usual upper die 9 with a block 10 holding the die against the upper circumference of the pipe. Lower dies 11 are similarly circumferentially situated about the lower portion of the pipe and are suitably supported on the floor. With conventional apparatus for moving opposite dies in and out, this apparatus not being shown, holding fixture 8 operates in a well known manner to clamp a pipe blank together so that the seam edges are brought to seam 2. Dies 9 and 11 are also releasable to permit removal of pipe blank 1 after welding. In accordance with the invention the fixture need only be of moderate size, compared to usual fixtures in resistance welding or arc welding. However, sufficient force must be exerted across blank 1 to maintain the edges together when subjected to the stress resulting from the cooling weld.

Welding units 3 and 4 are supported for operation along the weld line by a travel beam 12 which is suitably supported over blank 1. A variety of constructions can be utilized to support welding units 3 and 4, and they may be movable along the weld line and should have a degree of lateral adjustment.

Figure 2:
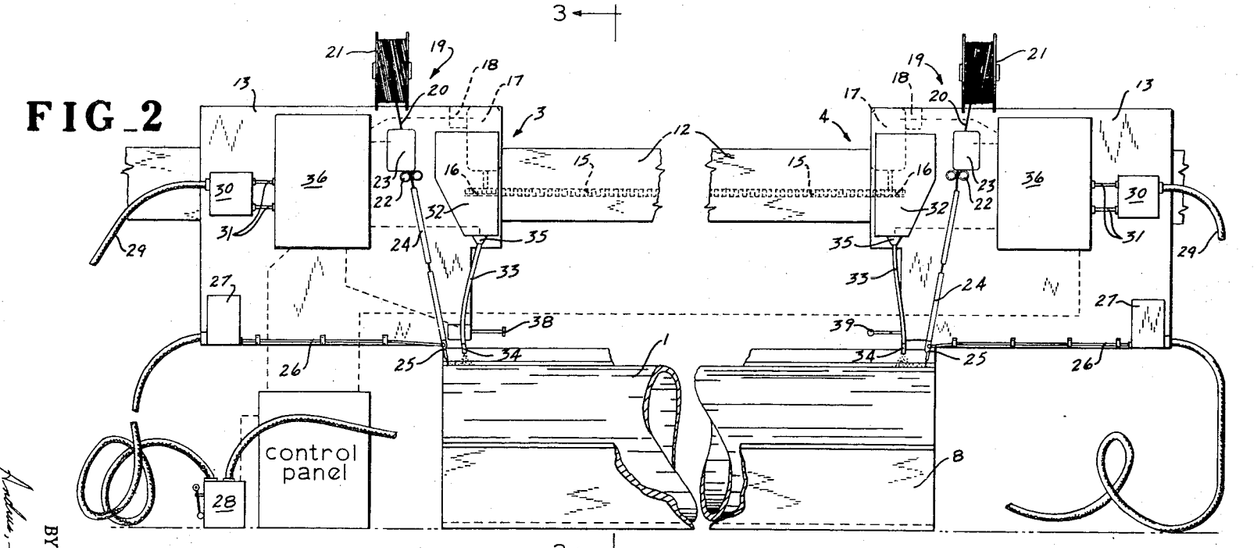
FIG. 2 is a side elevation of the apparatus of the invention with some accessory parts broken away to show the pipe blank.

Both welding units 3 and 4 may be constructed generally the same and may be available submerged arc welders with the modifications noted herein. One unit will be described in connection with FIGS. 2 and 3. The unit is carried by a carriage 13 having frame support members to which the various parts of the welding unit are attached. Rollers 14, rotatably attached to the carriage, are engaged with corresponding longitudinal edges of travel beam 12 to support carriage 13 thereon. To operate the carriage along the beam, a rack 15 is disposed along the length of beam 12. A corresponding pinion gear 16 engages the rack and is disposed on the shaft of a carriage drive motor 17. Motor 17 may be selected from many available types, and is operated by a motor control 18 having suitable switches and contactors such as to drive the motor rotor in both directions and to stop the rotor as desired. It is important in submerged arc welding to have a motor and control which can maintain a set speed while it is also desired to have a system that may be adjusted to several speeds.

Welding unit 3 should terminate operation precisely as it meets unit 4 at a point along seam 2. For that reason, a dynamic braking system is included in control 18 in order to terminate the rotation of pinion gear 16 more quickly. Any conventional circuit may be employed and is not shown in detail in the Figures. The operation of such circuits are well known and generally serve to reverse the lead polarity of the armature circuit when control 18 cuts power to the motor. This serves to dynamically brake the motor.

As in the usual arc welding unit, a welding head 19 is included and operates to provide the hot end 5 of an electrode wire 20 to the weld. The assembly has the usual wire reel 21 attached for rotation on carriage 13. Drive rolls 22 suitably driven by a wire feed motor 23 draw wire 20 from reel 21 in a well known manner. Motor 23 is suitably electrically connected to a control as detailed later, and is connected to drive rolls 22 by a suitable gear linkage.

From drive rolls 22 the wire extends through a sheath 24 to a nozzle 25 which positions the electrodes into the weld seam. A welding power cable 26 is suitably electrically connected between wire electrode 20 and a transformer 27 which is energized by an extendable cable leading through suitable line switch starter 28.

Also leading to power is another extendable cable 29 which energizes a control transformer 30, to which suitable cables 31 are connected for energizing motor 17 and the welding head apparatus 19.

Powder flux 7 may be automatically supplied along the weld line as the welding unit travels along the seam. For this purpose a flux hopper 32 is attached at the forward end of carriage 13 and has a conduit 33 extending from a discharge opening in the bottom of the hopper to a flux nozzle 34 disposed over seam 2 just forward of electrode nozzle 25. A solenoid valve 35 controls the flow of flux 7 and is electrically connected to a control as shown schematically in FIG. 2.

A control panel disposed on the floor operates switches in a box 36 on each unit to accomplish the sequencing method of the invention. The circuits of the various control elements may be standard in themselves and exemplary elements are illustrated schematically in FIG. 4.

The operation of both units 3 and 4 may be initiated by a standard, self-latching starter switch network 37 that is manually operated until the units move to permit a standard limit switch in a paralleled circuit to close. The manual switch closes relay contacts for energizing the control circuit of a unit and the line starter 28 for welding power, and the limit switch maintains the contacts closed until the welding unit again engages a suitable cam to open the limit switch at the end of the pipe.

In accordance with the invention, a set of switches in each box 36 is operated to control the stopping and reversing of the welding units. To initiate this operation, a cam switch 38 and a cam arm 39 are on opposing units with switch 38 disposed on the forward end of its respective carriage 13 in any manner suitable for engagement by the opposite arm 39 when the welding units meet at a point on seam 2. For this purpose, each cam arm 39 is adjustable and is attached on the forward end of its carriage 13 to extend forwardly of the unit a distance predetermined in accordance with the method of the invention as explained below.

For this purpose, the control panel and boxes 36 have various switches and relays and additional programming circuitry which may be constructed from available automatic switching devices such as the relay system shown in the figures, or from suitable solid state switching circuitry or cam operated switching and the like.

Circuits in the control panel and switch boxes 36 are interconnected with the various lines which energize motor 17, motor control 18, wire feed motor 23 and hopper valve 35 for operation in accordance with the method of the invention described below. As schematically illustrated in the example in FIG. 4, a coil activated by a switch 38 controls a set of relay switches in unit 3, including a latching circuit across switch 38, a normally open reverse timer switch 40, a wire feed switch 41, a hopper valve switch 42 and a motor control switch 43, which are all normally closed and remain closed when the welding units are operating in the forward direction.

Figure 4:
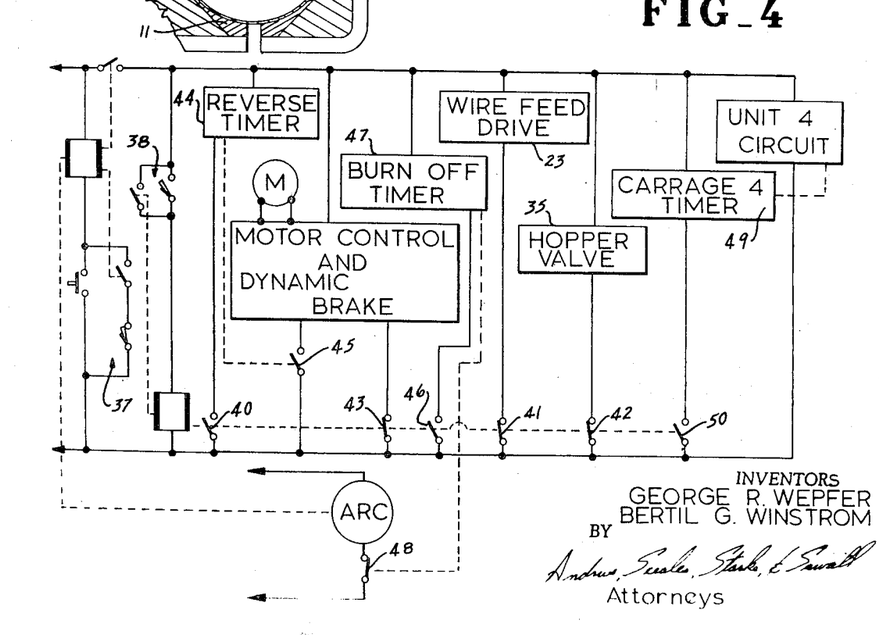
FIG. 4 is a schematic diagram of a control for a first welding unit.

The elements controlled by the switches are shown in block diagram in FIG. 4. Switch 40 controls a reverse timer 44, which is described below. Switch 43 connects to motor control 18 and to a suitable forward drive circuit in the motor control to drive the carriage drive motor forward when switch 43 is closed. Switches 41 and 42 control their respective systems, or wire feed drive 23 and hopper valve 35. Thus, for stopping and reversing unit 3, switch 38 is closed, switch 40 is closed to start reverse timer 44, switch 43 is opened to cut power from motor control 18, and wire feed drive 23 and hopper valve 35 are disconnected by their switches 41 and 42, while the latching circuit for switch 38 maintains this condition.

Reverse timer 44 delays for a short time period in order to avoid high current in the motor windings for carriage drive 17. After the delay, timer 44 closes a reverse switch 45 which energizes a reverse polarity circuit in control 18 to drive the carriage motor back. Such controls and timers are well known and will not be described in greater detail.

The control panel also switches the welding power on and off. In accordance with the invention, it is desired to burn off hot ends 5 and 6 before switching the welding power off and for this purpose, switch 38 also closes a burn off switch 46 which energizes a burn off timer 47. Timer 47 delays and then opens a normally closed line switch 48 in the welding power circuit to terminate the arcs when hot electrode end 5 has burned off.

Thus, when cam switch 38 is closed by the opposite cam arm 39, submerged arc unit 3 terminates the wire feed and flux feed, the carriage is braked to a stop and then reversed, and after a delay, power is cut off to the electrode. Switch 38 remains latched closed so that unit 3 returns with only the carriage drive being energized. At the end of the pipe the limit switch is opened in network 37 and this unlatches switch 38 as well as de-energizing the control circuit, to reset the switches to their normal conditions at rest.

The control panel and switching box 36 on unit 4 provide a different operation for unit 4, but the circuitry may be schematically shown in the same circuit of FIG. 4. The networks for unit 4 may be generally the same as those in unit 3 except for one major addition:

The controls for unit 4 have a control timer 49 with a suitable coil which controls a set of relay switches corresponding to switches 40, 41, 42, 43 and 46 for corresponding elements in the unit 4 circuit. As in unit 3, these switches open and close their respective system to line circuits. Control timer 49 is in turn controlled by a control timer relay switch 50 operated by the coil at cam switch 38. Closing switch 38 closes switch 50 to energize control timer 49.

Timer 49 may have any standard type of switching network which, in accordance with the invention, delays for a preset time after being energized and then energizes the unit 4 circuit to follow the same sequence as in unit 3.

Thus, timer 49 operates a set of relay switches just as cam switch 38 operates the corresponding switches in the control for unit 3. The shut down sequence is therefore the same for both units, except that unit 4 delays shut down for a predetermined period. Cam switch 38 and cam arm 39 activate both control networks simultaneously, so that the units both go into a sequential shut down and return operation when the carriages meet. The timing of the sequence is such that unit 3 stops, then returns, and unit 4 continues to weld, following the returning unit 3 to merge the welds and overlap them at the center. Then unit 4 returns and stops at its limit switch.

METHOD OF THE INVENTION

The above described systems are illustrated as particularly advantageous examples of units which may be used to practice the method of the invention. To further describe the method, pipe blank 1 is appropriately disposed for seam welding within fixture 8 and the dies are operated to hold the longitudinal edges together to form seam line 2. Then, submerged arc welding units 3 and 4 are simultaneously started at opposite ends of the edges of blank 1 which will be formed into seam 2. At this time the control panel and switch boxes 36 have all of their respective welding systems operative, meaning that all of the relay switches 41, 42, 43 and 48 are closed for both units. Carriage motors 17 are driving their pinion gears 16 along rack 15 toward each other. Motor contactors 18 are thus in a predetermined switching condition to energize the motor windings for forward operation. As the units move toward each other along seam 2, wire feed motor 23 is operating, the welding power is on and electrodes 20 extend through flux 7 to establish an arc, thus welding the blank seam together on their respective ends. Hopper valves 35 are also open so that flux is continuously fed through nozzles 34 ahead of the electrodes, as is common in submerged arc welding.

The submerged arc process of the invention thus accomplishes the weld first at both ends of the workpiece. In this way a fixture can hold the ends together and the weld will have solidified on the ends before shrinkage stresses build as the welding is completed. End cracking of the weld and splitting of the pipe is thereby avoided.

Figure 5:
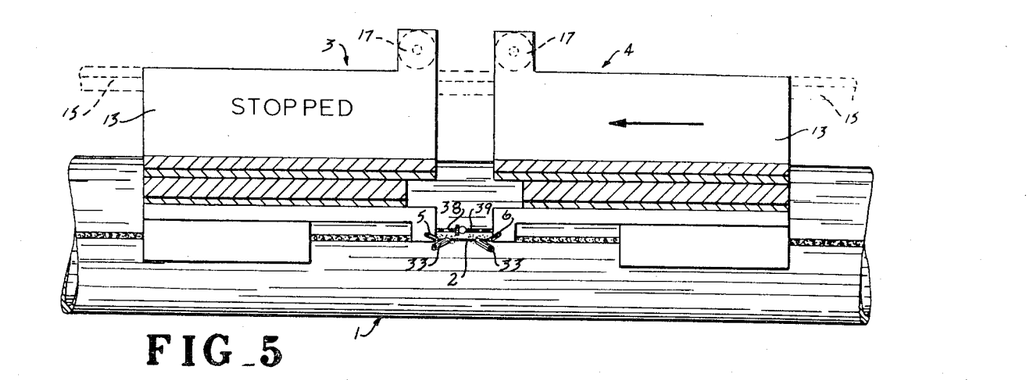
FIG. 5 is a section taken along line 5—5 of FIG. 3, with parts broken away, the view showing the welding units in a first position.
Figure 6:
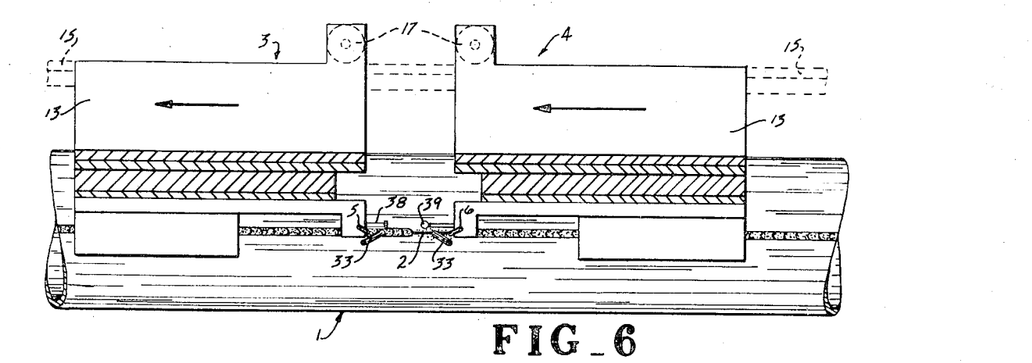
FIG. 6 is a view like FIG. 5 with the welding units in a second position.
Figure 7:
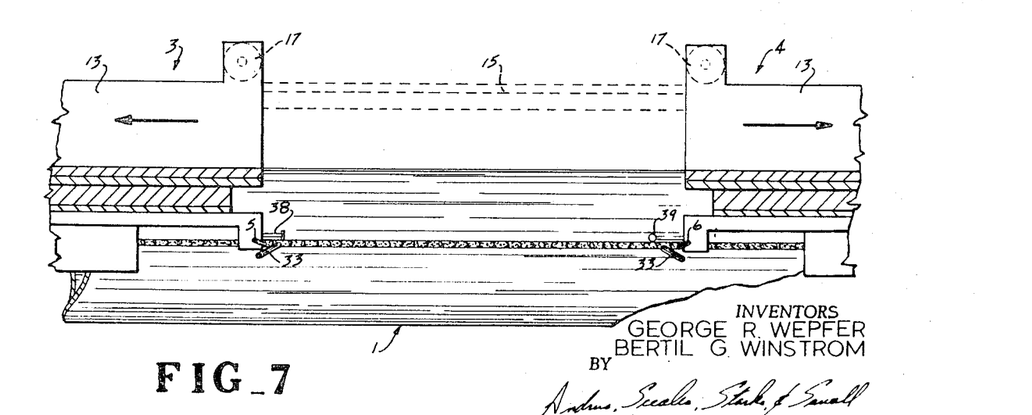
FIG. 7 is a view like FIGS. 5 and 6 with the welding units in a third position.
Figure 8:
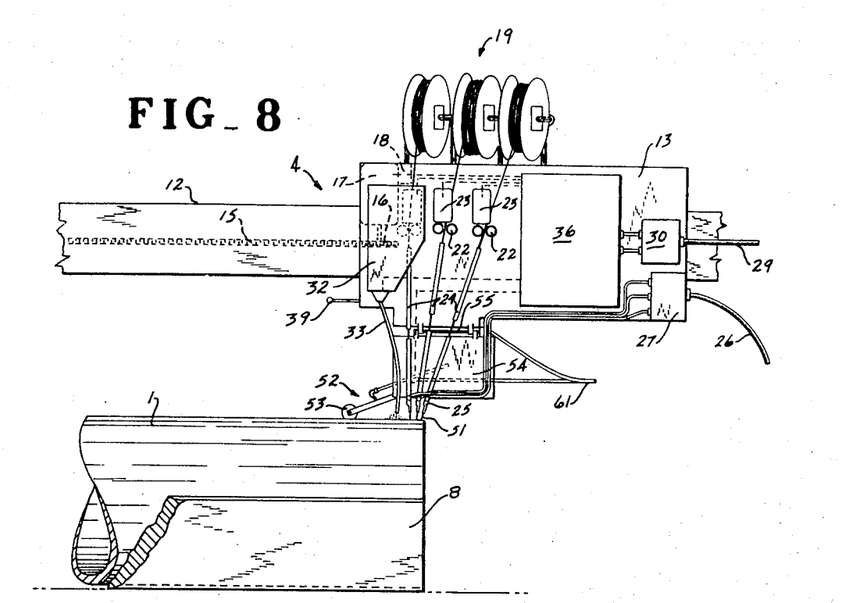
FIG. 8 is a side elevation of part of a modified form of the invention.

The welding units will meet toward the center of the seam, as shown in FIG. 5, and the sequential operation of the invention, as shown in FIGS. 6 and 7, assures a continuous or full length and high quality weld. In accordance with the invention, cam arm 39 engages cam operated switch 38 and activates the switching networks of the control panel and switch boxes 36. The control shuts down the operation of unit 3, as detailed above, and reverses the travel of the unit, leaving a hot crater for several inches or more at the inner end of its weld line. The control maintains the travel and welding operation of unit 4 due to the delay preset in timer 49. Unit 4 thus closes the weld between its portion of seam 2 and the weld accomplished by unit 3, and then continues to weld into the still hot weld left at the center by unit 3. The fused flux over the weld remains molten or at least conductive, so that unit 4 can continue to arc to the pipe. Unit 4 does not begin to shut down its various systems and reverse travel until welding for a predetermined portion of overlap.

Control timer 49 is set to determine the distance which unit 4 welds into the hot crater left by unit 3. This is done in relation to other factors, including the length of arm 39 and cam switch 38 which predetermine the distance between the electrodes of units 3 and 4 when switch 38 closes. Also a factor, the speed of travel of unit 4 must be such that the distance between the opposing welds is closed fast enough so that the fused flux is hot enough to conduct as electrode 20 of unit 4 reaches it.

The aforementioned distance and speeds, will vary according to the specific system used to practice the invention. Sample values which were found to work included carriage speeds in the order of 20–25 inches per minute, the length of arms 39 being such that a distance of 2–4 inches was left between welds when unit 3 completed its half of the seam. Unit 4 then welded into the crater left by unit 3 for a distance in the order of 4–6 inches. For this length of overlap, the fused flux left by unit 3 remained conductive for the time required, with a high quality continuous weld being accomplished. The speeds and distances should d be determined such that an overlap of about 5–8 inches is accomplished in less than about 8 seconds. Testing of the specific apparatus in the field will suggest appropriate variances from these values.

The hot ends 5 and 6 of electrodes 20 are caused to burn off so that the welding units can return over their welds. To do this when the welding operation in a unit 3 or 4 is terminating, wire feed switch 41 opens immediately to stop wire feed drive 23 and burn off switch 46 closes, thus activating the time delay switching operation in timer 47. Timer 47 then opens switch 48, cutting power from electrode 20 after it has burned off its end 5.

While unit 3 is in its shut down and reverse sequence, timer 49 is maintaining the forward operation of unit 4, so that it follows the returning unit and welds over a portion of the weld which has been provided by unit 3. After the predetermined delay, timer 49 opens and closes the corresponding switches in control 36 for unit 4 in the same way as in unit 3 to shut down and return unit 4 similarly to the operation of unit 3. The welds thus have been completed and merged with a uniform, continuous overlap.

MODIFICATION

Certain advantages of welding speed and quality of the welds are attained by employing multiple electrodes on the welding heads. A three-electrode embodiment of the invention is illustrated in FIGS. 8–12. Similar components are numbered identically to corresponding parts in the previous figures.

Only one submerged arc welding head is illustrated in the drawing, but two generally identical units are employed in the same arrangement as units 3 and 4 of the embodiment shown in FIGS. 1–7. The unit illustrated in FIG. 8 would generally follow the operation sequence of unit 4 in the previous arrangement and has a control and switch, which differ from the corresponding controls of the previous embodiment by having additional switching networks as explained below.

Each unit in this embodiment has three electrodes 51, in an in-line arrangement along seam 2. For that purpose, each unit has three welding heads, each of which may be constructed like assembly 19 in the former embodiment. Also, three cables, like cable 26, are connected to a transformer to supply the desired power level to each electrode. The carriage, hopper and other elements remain the same as in FIG. 2.

The operation of the opposite unit, which is not shown, is generally the same as in single electrode unit 3 except that three electrodes must be controlled. To do this, the switching networks shown in FIG. 4 need be modified only to add similar switching controls for the additional welding head and electrode power circuits. They will be similarly controlled by cam operated switch 38.

Also included as an advantageous feature in the modified embodiment is a retractable seam follower 52 which is operatively connected to carriage 13 ahead of the lead electrode 51. The opposing welding unit has a similarly situated seam follower. Seam follower 52 has a wheel probe 53 which runs between the pipe edges at seam 2 and adjusts the welding heads in order to maintain electrodes 51 in proper position over seam 2.

So that the electrodes may be moved laterally of the pipe, carriage 13 has a pivotal nozzle support section 54, which rotates about a fixed shaft 55 secured by suitable supports to the underside of carriage 13. Bushings 56 provide the rotatable connection between section 54 and shaft 55. Seam follower 52 is secured to the leading edge of nozzle support section 54 and electrodes 51 will thus follow the position of wheel 53 as it tracks along the seam.

It is desired to permit the welding units to be as close as possible when they meet at the intermediate point on the weld. To dispose the seam followers out of the way, wheel 53 is on an axle attached to support arm 57 that normally holds the wheel back of cam arm to 39 and in seam 2. Arm 57 is pivotally attached at the leading edge of section 54 and, there, is fixed to a lever arm 58. Lever 58, in turn, is attached to the shaft of a two-way hydraulic cylinder 59 for positioning and retracting arm 57.

Cylinder 59 is controlled by a four-way valve manifold 60. Manifold 60 has a standard solenoid valve which operates to apply air pressure to one side or the other of the piston in hydraulic cylinder 59, for driving the shaft in or out. An extendable air pressure line 61 leading from a compresser, not shown, provides the air pressure for this operation.

The solenoid valve in manifold 60 is operated by switch 38, as are the other control elements. In this way, the seam followers 52 on the two units will retract when witch 38 closes to be drawn out of the way of the meeting welding heads and so that the follower on one unit will not track through the weld of the other unit.

The invention also contemplates a means of locking the electrodes in position when the seam followers are retracted. For the short remaining distance of the weld line, any deviation from the center of seam 2 would be slight and, in this embodiment, the electrodes are continued in the lateral position that followers 52 left them as the followers are retracted. This is accomplished by an air brake 62 or other brake applied to shaft 55 when switch 38 closes. Shown sectioned in FIG. 10, air brake 62 may be any available variety, with an inflatable brake cushion 63 which fits between a brake shoe 64 on one bushing 56 and a rim 65 secured to fix shaft 55. A valve 66 to cushion 63 leads to a solenoid valve, not shown, which opens the cushion to an air pressure supply, also not shown, in response to actuation by switch 38. By this means, section 54 is locked in position on shaft 55 to guide electrodes 51 in the same direction as just before the seam followers were retracted.

Figure 9:
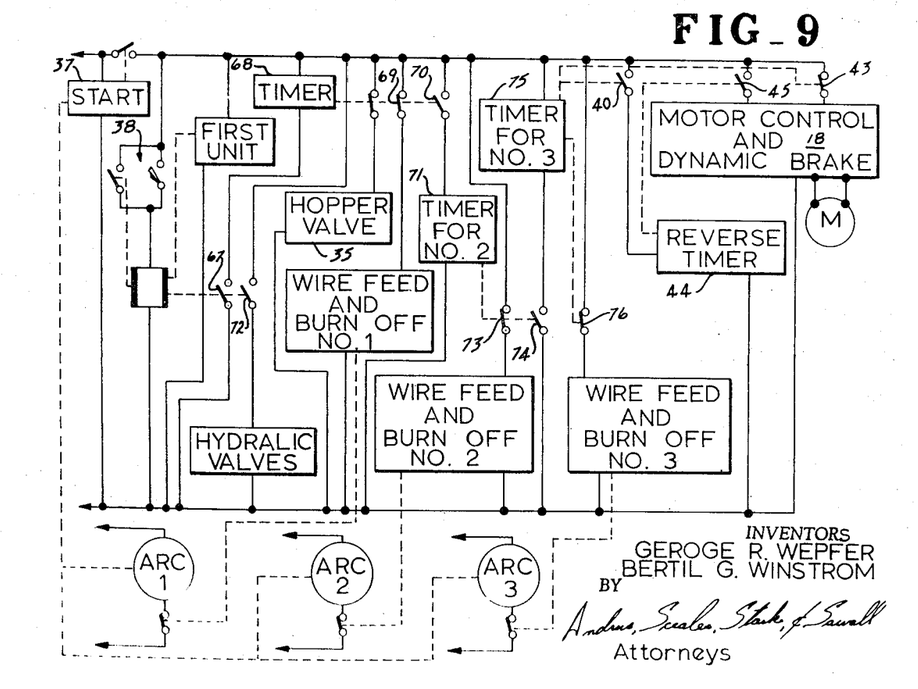
FIG. 9 is a schematic diagram of a control for the apparatus shown in FIG. 8.
Figure 10:
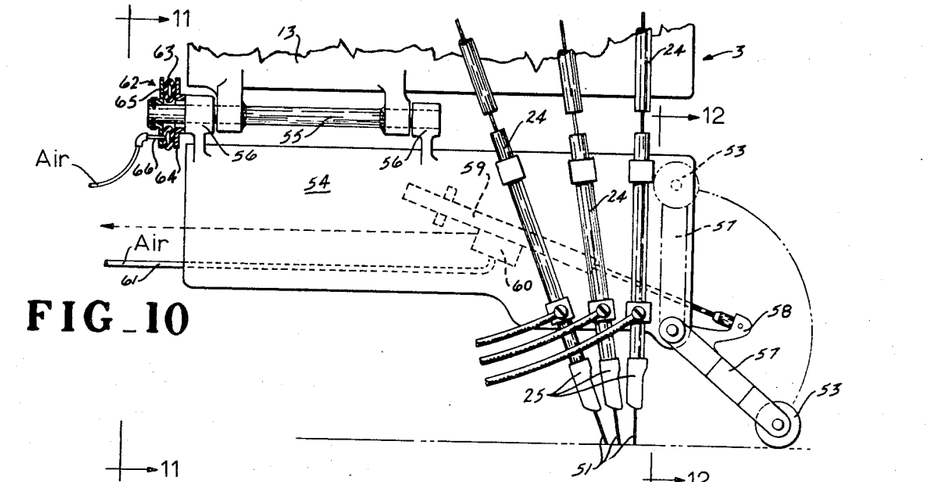
FIG. 10 is an enlarged side elevation of a part of a welding unit as in FIG. 8.
Figure 11:
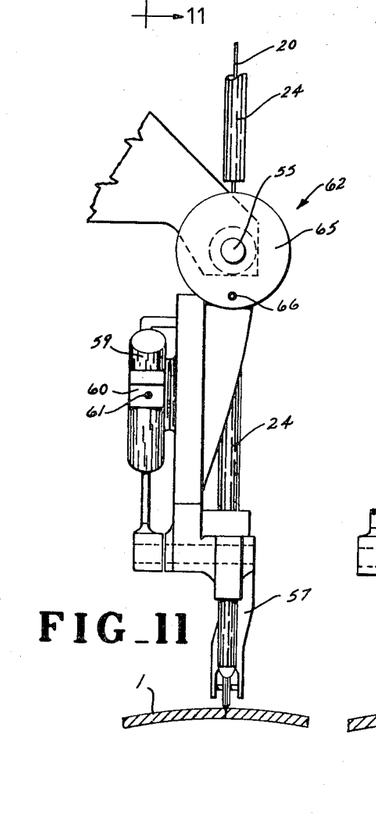
FIG. 11 is an enlarged end view of the structure in FIG. 10 taken along lines 11—11.
Figure 12:
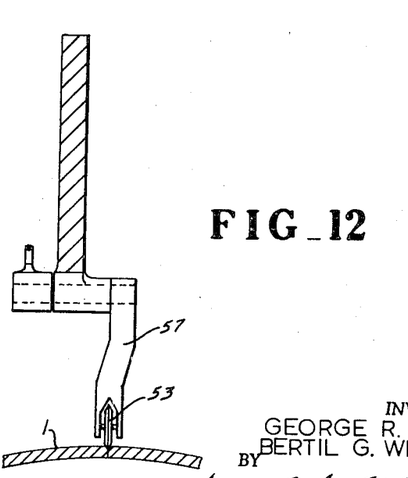
FIG. 12 is an enlarged sectional view of the structure in FIG. 10 taken along lines 12—12.

A schematic diagram of the controls and switches for the modified embodiment is illustrated in FIG. 9. When the units meet, cam arm 39 closes and latches switch 38, as in the previous embodiment. Switch 38 operates the control circuits for unit 3, which may be the same as in FIG. 5, except that additional systems are added to control the additional electrodes.

As in the previous embodiment, switch 38 closes a normally open control timer switch 67, to energize a control timer 68 for the second unit which continues to weld. Timer 68 delays, and then starts the shut down sequence for the second unit, opening a normally closed burn off switch 69 which operates the wire feed drive and burns off sequence for the first electrode 51. In this example, the burn off could be accomplished by de-energizing the wire feed drive immediately when switch 69 opens and timing out the switch for cutting power to the electrode with a suitable delay relay. These systems are standard and are shown in block diagram in FIG. 9.

Timer 68 also closes a normally open switch 70 for the number two electrode, thus energizing a number two timer 71. Hopper valve 35 is also opened as before, by timer 68, and switch 38 energizes a normally open, seam follower, control switch 72 is closed to operate hydraulic cylinder 59, which retracts wheel probe 53. Additionally, switch 72 sets brake 62 for simultaneous operation with cylinder 59.

Thus, when switch 38 closes, the unit continues to weld and move forward, but the lead electrode terminates welding after burning off, the probe is retracted and the electrodes are locked in position, the hopper valve is closed and a timer for electrode number two is energized.

The shut down sequence for the second unit electrodes is preferably in the 1–2–3 order, after which the carriage motor is stopped, delayed and then reversed as before. As shown schematically in FIG. 9, number two timer 71 delays and then opens a normally closed switch 73 to operate the burn-off and shut-off sequence for electrode number two, in the same manner as the burn-off sequence for the number one electrode. Timer 71 also closes a normally open number three timer switch 74, thereby energizing a number three timer 75. After delaying, number three timer 75 opens a normally closed switch 76 which, like for the other two electrodes, generates the burn off for the number three electrode. Timer 75 also closes the switch for reverse timer 44 and opens the switch to the forward drive circuitry of motor control 18 to brake the motor to a stop, delay it for a short time and then reverse it as in the previous embodiment.

By this sequencing, lead electrode 51 should burn off at the end of the weld left by the first welding unit; number two electrode 51 overlaps the weld to about where the corresponding electrode on the other circuit left off; and number three electrode 51 finishes the overlap, after which the unit is stopped and returned. Flux would be supplied for the second unit for a time after valve 35 is closed, depending on the length of the tube 33 which has residual flux that continues to flow as the unit overlaps the weld.

The systems described herein must, of course, be reset when the welding units have reversed to travel to their respective ends of the pipe. Limit switch system 37, as described in the previous example, is suitable for this purpose and it is contemplated that the timers and other systems will reset when power is cut off by the limit switch. These items are standard and need not be described for purposes of the invention here.

The method of the invention as practiced by this apparatus is generally the same as before, excepting the sequential shut down of the three electrode welding on the second unit. As the two welding units meet, the first stops welding and returns as before, and the second unit continues over the weld left by the first while the fused flux remains conductive or molten.

The sequential shut down of the multiple electrodes provides a uniform weld at the merger of the two welds. The smoothness of this merger can be affected by the manner of shutting down the electrodes on the second unit and the positions and overlap which each electrode achieves at shut down. Optimum results are achieved where the first electrode on the second unit terminates welding within one-half inch either way of where the first electrode of the first unit stopped. Neither undercut nor undue expansion of the weld at the merger will result in this range. Further, smoothness of the merger is facilitated if the second electrode of the second unit terminates its overlapping weld at the approximate area where the corresponding electrode on the first unit stopped. The third electrode, it is found, should continue for a similar distance past the furthest position of the corresponding third electrode on the other unit, if the smoothest overlap is desired. The timer delay switching for the electrodes can be preset in accordance with the speeds and distances to provide this operation.

Thus, the method of the invention may be practiced so that a submerged arc welding can be initiated at both ends of a weld line and merged in between by welding with one sub-arc unit over the weld provided by the first, while the fused flux on that portion of the first weld remains hot and conductive.

Various modes of carrying out the invention are contemplated as being within the scope of the following claims which particularly point out and distinctly claim the subject matter which is regarded as the invention.

We claim:

1. An apparatus for submerged arc welding to form welds along weld seams of a workpiece, the apparatus comprising in combination:

two opposing submerged arc welding units movably mounted adjacent said weld seam, and having welding electrodes disposed for welding in said weld seam; and a control unit having switching means for operatively moving and controlling said welding units from opposing ends of the weld seam and for controlling a sequential shut down of said units in response to the proximate approach of said units as the two welds are overlappingly merged and completed.

2. The apparatus of claim 1, wherein said switching means includes a cam operated switch connected to a first of said welding units and a corresponding cam arm connected to a second of said welding units, said switch and said arm disposed at forward ends of said units and operatively engage when said welding units proximately approach each other along said weld seam.

3. An apparatus for submerged arc welding to form welds along weld seams of a workpiece, the apparatus comprising in combination:

two opposing submerged arc welding units movably mounted adjacent said weld seam, each of said units including a reversable carriage drive operable to move the unit back and forth along said weld seam, a consumable electrode disposed in the weld by a wire feed motor for welding in said weld seam, the electrode being provided with welding power by an extendable cable electrically connected with the electrode; and a control unit having switching means for controlling the operation of the two units such as to move them from opposing ends of the weld seam and for controlling a sequential shut down of the units as the two welds are merged and completed and including a timing means for stopping and reversing said carriage drives, for stopping the wire feed motor, and for switching off the welding power provided by said cable, said timing means comprising means selectively stopping and reversing one of said carriage drives while delaying the stopping and reversing of the other of said carriage drives for a predetermined time for mutually joining the welds provided by the two welding units.

4. The apparatus of claim 3, wherein said extendable cable includes a switch controlled in response to the stopping of said carriage drive by a welding power timer means for delaying the switching off of the welding power until the wire feed motor has been stopped for a predetermined period to burn off the electrode above a weld.

5. The apparatus of claim 1 and including:

a first and a second retractable seam followers each pivotally connected at forward ends of first and second of said welding units respectively; and control means connected to said seam followers for retracting said seam followers in response to the operation of said switching means when said opposing welding units meet.

6. The apparatus of claim 5, wherein the welding electrodes are adjustable to follow said seam followers and including lock means connected to said welding units for locking the electrodes in position when the seam followers retract.

7. The apparatus of claim 1, wherein said switching means includes sensing means connected to one of said welding units for providing an output signal in response to the proximate approach of said welding units to sequentially shut down the welding operations of said welding units.

8. The apparatus of claim 1, wherein said control unit includes a sensing means for providing a control signal in response to the proximate approach of a first and a second of said welding units, said switching means effective for stopping the welding operation and reversing the movement of said first welding unit in response to said control signal, said control unit further including a timing means for sequentially stopping and reversing said second welding unit in response to a predetermined time following the stopping and reversing of said first welding unit to ensure the merging of the two welds.

9. The apparatus of claim 1, wherein said welding units include a first welding unit having a first and a second welding electrodes for welding in said seam and a second welding unit having a third and fourth welding electrodes also for welding in said seam, a sensing means for providing a control signal in response to the proximate approach of said first and second welding units, said switching means operatively connected to said sensing means for operating a first timing means of said control unit in response to said control signal to stop the welding operation of said first welding electrode while said second, third and fourth electrodes continue welding operation, said control unit providing a second timing means for stopping the welding operation of said second welding electrode in timed response to the operation of said first timing means and for reversing the movement of said first welding unit, said control unit further providing a third timing means for stopping the welding operation of said third welding electrode in timed response to said control signal and a fourth timing means for stopping the welding operation of said fourth welding electrode and for reversing the movement of said second welding unit in timed response to the operation of said third timing means with the weld provided by said fourth electrode overlapping the weld provided by at least one of said first and second electrodes and with the second welding unit reversing movement in timed response to the reversal of said first welding unit.

* * * * *